US012731782B2

(12) United States Patent
Lin et al.

(10) Patent No.: US 12,731,782 B2
(45) Date of Patent: Sep. 8, 2026

(54) PRELITHIATED ANODE ACTIVE MATERIAL PARTICLES FOR LITHIUM-ION BATTERIES AND PRODUCTION METHOD

(71) Applicant: Nanotek Instruments, Inc., Dayton, OH (US)

(72) Inventors: Yen-Po Lin, Hsinchu City (TW); Yu-Sheng Su, Dayton, OH (US); Bor Z. Jang, Centerville, OH (US)

(73) Assignee: Honeycomb Battery Company, Dayton, OH (US)

( * ) Notice: Subject to any disclaimer, the term of this patent is extended or adjusted under 35 U.S.C. 154(b) by 0 days.

(21) Appl. No.: 16/505,021

(22) Filed: Jul. 8, 2019

(65) Prior Publication Data

US 2021/0013490 A1 Jan. 14, 2021

(51) Int. Cl.

*H01M 4/36* (2006.01)
*H01M 4/133* (2010.01)
*H01M 4/58* (2010.01)
*H01M 10/0525* (2010.01)
*H01M 10/0569* (2010.01)

(52) U.S. Cl.

CPC ........... *H01M 4/366* (2013.01); *H01M 4/133* (2013.01); *H01M 4/58* (2013.01); *H01M 10/0525* (2013.01); *H01M 10/0569* (2013.01)

(58) Field of Classification Search

CPC .... H01M 4/366; H01M 4/58; H01M 10/0569; H01M 10/0525; H01M 4/133

See application file for complete search history.

(56) References Cited

U.S. PATENT DOCUMENTS 4,980,250 A 12/1990 Takahashi et al.
5,601,951 A 2/1997 Johnson et al.
5,759,715 A * 6/1998 Barker .................. H01M 4/485 429/331
6,335,115 B1 1/2002 Meissner
6,706,447 B2 3/2004 Gao et al.
7,094,499 B1 8/2006 Hung
7,276,314 B2 10/2007 Gao et al.
8,846,251 B2 * 9/2014 Cui ......................... H01M 4/38 429/231.95
2005/0130043 A1 6/2005 Gao et al.
2010/0173198 A1 * 7/2010 Zhamu .................. H01M 4/587 429/222
2015/0188189 A1 * 7/2015 Armand ................. H01B 1/122 429/314
2015/0236342 A1 * 8/2015 Rojeski ............... H01M 4/8626 429/218.1

(Continued)

OTHER PUBLICATIONS

Umeno et al. “Novel Anode Material for Lithium-Ion Batteries: Carbon-coated Silicon Prepared by Thermal Vapor Decomposition” Chemistry Letters (2001) pp. 1186-1187.

*Primary Examiner* — Michael L Dignan

(57) ABSTRACT

Provided is a prelithiated anode active material particle for use in a lithium-ion battery, the particle is capable of reversibly storing lithium ions therein during a charge or discharge of the battery and comprises an amount of lithium from 1% to 100% of a maximum lithium content that can be contained in the anode active material particle, having a first lithium concentration $C_1$ near a particle surface and a second lithium concentration $C_2$ inside the particle and away from the particle surface and wherein $C_1 < C_2$.

13 Claims, 6 Drawing Sheets

(56) References Cited

U.S. PATENT DOCUMENTS

2016/0118652 A1* 4/2016 Wu ........................ H01M 4/587
429/213
2016/0149216 A1* 5/2016 Mizuno .............. C08G 18/6674
252/500
2016/0344067 A1* 11/2016 Laramie .................... B05D 1/12
2017/0194663 A1* 7/2017 Zhamu ..................... C25D 9/08
2017/0288211 A1* 10/2017 Zhamu .................. H01M 4/483
2017/0294648 A1* 10/2017 Burshtain ........... H01M 4/0404
2017/0338490 A1* 11/2017 Xiao ..................... H01M 4/134
2018/0062160 A1* 3/2018 Kasamatsu ............. H01M 4/36

* cited by examiner

PRELITHIATED ANODE ACTIVE MATERIAL PARTICLES FOR LITHIUM-ION BATTERIES AND PRODUCTION METHOD

FIELD

The present disclosure provides a prelithiated anode active material and an anode electrode containing such a prelithiated anode material for use in a secondary lithium-ion battery. Also provided is a method of producing such an anode material, anode electrode, and battery.

BACKGROUND

Concerns over the safety of earlier lithium secondary batteries led to the development of lithium ion secondary batteries, in which pure lithium metal sheet or film was replaced by carbonaceous materials as the negative electrode (anode). The carbonaceous material may comprise primarily graphite that is intercalated with lithium and the resulting graphite intercalation compound may be expressed as $Li_xC_6$, where x is typically less than 1. In order to minimize the loss in energy density due to this replacement, x in $Li_xC_6$ must be maximized and the irreversible capacity loss $Q_{ir}$ in the first charge of the battery must be minimized. The maximum amount of lithium that can be reversibly intercalated into the interstices between graphene planes of a perfect graphite crystal is generally believed to occur in a graphite intercalation compound represented by $Li_xC_6$ (x=1), corresponding to a theoretical specific capacity of 372 mAh/g.

In addition to carbon- or graphite-based anode materials, other inorganic materials that have been evaluated for potential anode applications include metal oxides, metal nitrides, metal sulfides, and a range of metals, metal alloys, and intermetallic compounds that can accommodate lithium atoms/ions. In particular, lithium alloys having a composition formula of $Li_aA$ (A is a metal such as Al, and "a" satisfies $0<a<5$) has been investigated as potential anode materials. This class of anode active materials has a higher theoretical capacity, e.g., $Li_4Si$ (maximum capacity=3,829 mAh/g), $Li_{4.4}Si$ (maximum capacity of Si=4,200 mAh/g), $Li_{4.4}Ge$ (maximum capacity of Ge=1,623 mAh/g), $Li_{4.4}Sn$ (maximum capacity of Sn=993 mAh/g), $Li_3Cd$ (maximum capacity of Cd=715 mAh/g), $Li_3Sb$ (maximum capacity of Sb=660 mAh/g), $Li_{4.4}Pb$ (569 mAh/g), LiZn (410 mAh/g), and $Li_3Bi$ (385 mAh/g).

An anode active material is normally used in a powder form, which is mixed with conductive additives and bonded by a binder resin. The binder also serves to bond the mixture to a current collector. Alternatively, an anode active material may be coated as a thin film onto a current collector. On repeated charge and discharge operations, the alloy particles tend to undergo pulverization and the current collector-supported thin films are prone to fragmentation due to expansion and contraction of the anode active material during the insertion and extraction of lithium ions. This pulverization or fragmentation results in loss of particle-to-particle contacts between the active material and the conductive additive or contacts between the anode material and its current collector. These adverse effects result in a significantly shortened charge-discharge cycle life.

To overcome the problems associated with such mechanical degradation, several approaches have been proposed, including (a) using nano-scaled particles of an anode active material, (b) composites composed of small electrochemically active particles supported by less active or non-active matrices or coatings, and (c) metal alloying. Examples of more promising active particles are Si, Sn, and $SnO_2$. For instance, Umeno, et al. ["Novel Anode Material for Lithium-Ion Batteries: Carbon-coated Silicon Prepared by Thermal Vapor Decomposition," Chemistry Letters, (2001) pp. 1186-1187] proposed an anode based on carbon-coated silicon prepared by thermal vapor decomposition. Although a specific capacity as high as 800-1,450 mAh/g was achieved, the capacity faded rapidly after 40 cycles. Hung [C. C. Hung, "Carbon Materials Metal/Metal Oxide Nanoparticle Composite and Battery Anode Composed of the Same, U.S. Pat. No. 7,094,499 (Aug. 22, 2006)] disclosed a method of forming a composite anode material. The steps include selecting a carbon material as a constituent part of the composite, chemically treating the selected carbon material to receive nanoparticles, incorporating nanoparticles into the chemically treated carbon material, and removing surface nanoparticles from an outside surface of the carbon material with incorporated nanoparticles. A material making up the nanoparticles alloys with lithium. The resulting carbon/nanoparticle composite anodes did not exhibit any significant increase in capacity, mostly lower than 400 mAh/g. In fact, most of prior art composite electrodes have deficiencies in some ways, e.g., in most cases, less than satisfactory reversible capacity, poor cycling stability, high irreversible capacity, ineffectiveness in reducing the internal stress or strain during the lithium ion insertion and extraction cycles, and some undesirable side effects.

The positive electrode (cathode) active material of a lithium-ion battery is typically selected from a broad array of lithium-containing or lithium-accommodating oxides, such as lithium manganese dioxide, lithium manganese composite oxide, lithium nickel oxide, lithium cobalt oxide, lithium nickel cobalt oxide, lithium vanadium oxide, and lithium iron phosphate. These prior art materials do not offer a high lithium insertion capacity and this capacity also tends to decay rapidly upon repeated charging and discharging. A practical specific capacity of a cathode material has been, at the most, up to 200 mAh/g of the cathode active material, which rapidly decays as the charge-discharge cycling operation proceeds. Since the cathode specific capacity is relatively low, there is a strong desire to make use of a cathode active material to its full capacity.

As a lithium-ion cell is charged and discharged, lithium is alternately stored in the cathode and in the anode, so that the total amount of cyclable charge corresponds to the amount of lithium shuttling back and forth between the two electrodes. When the cell is assembled, usually the cathode active material is made to store the amount of lithium available for the subsequent cyclic operation. This selection of cathode, instead of anode, to pre-store the needed lithium was mainly due to the notion that cathode active materials, such as lithium cobalt oxide, are relatively stable in ambient air (e.g., against oxidation) compared to lithiated graphite. However, the notion that this amount of lithium that determines the battery capacity is totally supplied from the cathode, limits the choice of cathode active materials because the active materials must contain removable lithium. Such a requirement prevents the use of other types of possibly higher-capacity cathode active materials; e.g. lithium-free chalcogen compounds, such as titanium disulfate or molybdenum disulfate, and transition metal fluoride, such as $FeF_3$. Also, delithiated products corresponding to $LiCoO_2$ and $LiNiO_2$ formed during charging (e.g. $Li_xCoO_2$ and $Li_xNiO_2$ where $0.4<x<1.0$) and overcharging (i.e. $Li_xCoO_2$ and $Li_xNiO_2$ where $x<0.4$) are not stable. In particular, these delithiated products tend to react with the electrolyte and generate heat, which raises safety concerns.

When the lithium-ion cell is assembled and filled with electrolyte, the anode and cathode active materials have a difference in potential of at most about 2 volts between each other. The difference in potential between the two electrodes, after the lithium-ion cell has been charged, is about 4 volts. When the lithium-ion cell is charged for the first time, lithium is extracted from the cathode and introduced into the anode. As a result, the anode potential is lowered significantly (toward the potential of metallic lithium), and the cathode potential is further increased (to become even more positive). These changes in potential may give rise to parasitic reactions on both electrodes, but more severely on the anode. For example, a decomposition product known as solid electrolyte interface (SEI) readily forms on the surfaces of carbon anodes, wherein the SEI layer comprises lithium and electrolyte components. These surface layers or covering layers are lithium-ion conductors which establish an ionic connection between the anode and the electrolyte and prevent the reactions from proceeding any further.

Formation of this SEI layer is therefore necessary for the stability of the half-cell system comprising the anode and the electrolyte. However, as the SEI layer is formed, a portion of the lithium introduced into the cells via the cathode is irreversibly bound and thus removed from cyclic operation, i.e. from the capacity available to the user. This means that, during the course of the first discharge, not as much lithium moves from the anode back to the cathode as had previously been released to the anode during the first charging operation. This phenomenon is called irreversible capacity and is known to consume about 10% to 30% of the capacity of a lithium ion cell.

A further drawback is that the formation of the SEI layer on the anode after the first charging operation may be incomplete and will continue to progress during the subsequent charging and discharge cycles. Even though this process becomes less pronounced with an increasing number of repeated charging and discharge cycles, it still causes continuous abstraction, from the system, of lithium which is no longer available for cyclic operation and thus for the capacity of the cell. Additionally, as indicated earlier, the formation of a solid-electrolyte interface layer consumes about 10% to 30% of the amount of lithium originally stored at the cathode, which is already low in capacity (typically <200 mAh/g). Clearly, it would be a significant advantage if the cells do not require the cathode to supply the required amount of lithium.

Takahashi, et al. ["Secondary Battery," U.S. Pat. No. 4,980,250, Dec. 25, 1990], disclosed methods by means of which lithium is introduced into the anode active material in order to minimize the lithium consumption and thus the irreversible capacity loss. However, prelithiated carbon- or graphite-based anode active materials lead to electrodes which can be handled only under non-oxidizing and dry conditions, making practical production of lithium ion batteries difficult.

Meissner [E. Meissner, "Secondary Lithium-ion Cell with an Auxiliary Electrode," U.S. Pat. No. 6,335,115 (Jan. 1, 2002)] disclosed a secondary lithium-ion cell which includes a lithium-intercalating, carbon-containing anode, a non-aqueous lithium ion-conducting electrolyte, and a lithium-intercalating cathode including a lithium-containing chalcogen compound of a transition metal, and a lithium-containing auxiliary electrode disposed in the cell to compensate for the irreversible capacity loss in the secondary lithium-ion cell. This auxiliary electrode is spatially separated from the electrolyte when the cell is positioned in a first orientation and contacts the electrolyte when the cell is oriented in a second position, for supplying additional lithium to the cell. Such an additional electrode makes the battery very complicated and difficult to make. Switching between two orientations is not a good strategy since it would complicate the handling of the battery and an average consumer would not pay attention to such a detail to ensure proper operation of such a battery.

The approach of using a sacrificial electrode, in addition to an anode and a cathode in a cell, was also proposed earlier by Johnson, et al. ["Rechargeable Lithium Ion Cell," U.S. Pat. No. 5,601,951, (Feb. 11, 1997)]. Again, this additional electrode further complicates the manufacture and operation of a resulting battery. The assembling operation of a battery containing a highly reactive lithium metal or alloy electrode must be handled in an oxygen-free and moisture-free environment.

Gao, et al. [Y. Gao, et al., "Lithium Metal Dispersion in Secondary Battery Anode," U.S. Pat. No. 6,706,447, Mar. 16, 2004 and U.S. Pat. No. 7,276,314 (Oct. 2, 2007)] disclosed a secondary battery containing an anode that is formed of a host material capable of absorbing and desorbing lithium in an electrochemical system and lithium metal dispersed in the host material. The lithium metal is a finely divided lithium powder and preferably has a mean particle size of less than about 20 microns. The host material comprises one or more materials selected from the group consisting of carbonaceous materials (e.g., graphite), Si, Sn, tin oxides, composite tin alloys, transition metal oxides, lithium metal nitrides and lithium metal oxides. The method of preparing such an anode includes the steps of providing a host material, dispersing lithium metal in the host material, and then forming the host material and the lithium metal dispersed therein into an anode. The lithium metal and the host material is mixed together with a non-aqueous liquid to produce a slurry and then applied to a current collector and dried to form the anode. Alternatively, the anode can be formed by chemical means by immersing the host material in a suspension of lithium metal in a non-aqueous liquid, and then formed into an anode. The approach of Gao, et al. has the following drawbacks:

(1) The anode is composed of an anode active material (e.g., graphite or Sn particles) and a discrete lithium metal phase (fine Li metal powder particles) forming a mixture of two types of particles. This implies that the anode still contains highly active lithium particles that are sensitive to oxygen and moisture and must be handled under very stringent conditions.

(2) The amount of lithium metal present in the anode is prescribed to be no more than the maximum amount sufficient to intercalate in, alloy with, or be absorbed by the host material in the anode. For example, if the host material is carbon, the amount of lithium is no more than the amount needed to make $LiC_6$. This implies that the amount of lithium needed for the SEI formation was not considered and, hence, the resulting battery will suffer a capacity loss of 10%-30% after the first cycle.

(3) It is of significance to note that although Gao, et al. mentioned in passing that the anode active material can be a mixture of carbon, Sn, Si, etc, the mixture still further contains lithium metal powder particles as an additional, discrete phase that is un-protected. The resulting multi-component, multi-phase mixture is still sensitive to the presence of oxygen and water contents in the air, thus significantly complicating the battery manufacturing operations.

(4) In a follow-on patent application, Gao, et al. [Y. Gao, et al. "Lithium metal dispersion in electrodes," US Patent Application Pub. No. 2005/0130043 (Jun. 16, 2005)] suggested methods of lithiating an electrode prior to combining electrodes and other components to form a battery. In all cases, the electrode is composed of a mixture of discrete lithium metal particles or wire screen and powder particles of a host material, the latter being partially litiated. As shown in FIG. 1 of Gao, et al., the anode comprises discrete lithium metal particles and a host material. Both the discrete lithium metal particles and lithiated carbonaceous material (graphite) are unstable in an oxygen- or moisture-containing environment. Furthermore, Gao, et al. have not fairly suggested how other anode active materials than graphite can be prelithiated in a controlled manner (e.g., without inducing a lithium coating on the surface of active material particles). In fact, no example was given to illustrate if or how other important anode active materials can be successfully prelithiated prior to battery production. No battery testing or electrochemical performance evaluation data was given in any of Gao's patent or patent application to demonstrate the advantages of their electrodes.

Therefore, there exists an urgent need for a secondary lithium ion battery that has one or more of the following features or advantages:

a) The battery does not contain a sacrificial electrode or an extra electrode in addition to an anode and cathode in a cell;
b) The battery comprises an anode that does not contain a discrete lithium metal phase or lithium metal powder particles dispersed in the anode;
c) The anode comprises at least two types of anode active material wherein at least one type of active material is not prelithiated (e.g., Si and Sn) and at least one type of active material is prelithiated (e.g., carbonaceous material, such as graphite, hard carbon, soft carbon, surface-modified graphite, chemically modified graphite, or meso-carbon micro-beads, MCMBs).
d) The battery contains an anode that comprises at least a non-carbon active material possessing an ultra-high lithium absorbing capacity (e.g., Si that exhibits a specific capacity up to 3,500 or even 4,200 mAh/g);
e) The battery comprises an anode that contains an excess amount of lithium (disposed inside a non-carbon anode active material, not on its surface) to compensate for the formation of SEI layers, in addition to providing enough lithium to intercalate into (or form a compound with) a cathode active material.
f) The battery features a long and stable cycle life due to an anode that comprises fine, prelithiated active particles capable of maintaining their integrity and their contact with the conductive additive and the current collector.

Therefore, in summary, a need exists for an anode active material that has a high specific capacity, a minimal irreversible capacity (or a low capacity decay rate), and a long cycle life. In order to accomplish these goals, we have worked diligently and intensively on the development of new electrode materials. These research and development efforts lead to the present patent application.

SUMMARY

In certain embodiments, the disclosure provides a prelithiated anode active material particle for use in a lithium-ion battery. The particle is capable of reversibly storing lithium ions therein during the charge or discharge of the battery and comprises an amount of lithium from 1% to 100% of a maximum lithium content that can be contained in the anode active material particle (e.g., in the case of Si, 100%=$Li_{4.4}Si$, wherein there are 4.4 Li atoms in 1 Si atom), having a first lithium concentration $C_1$ near the particle surface and a second lithium concentration $C_2$ inside the particle and away from the particle surface and wherein $C_1<C_2$. Preferably, the lithium concentration is substantially zero near or on the particle surface (i.e. $C_1 \approx 0$). There can be a lithium concentration gradient from substantially zero near the surface to a maximum concentration in the core area of the anode particle. Such an essentially lithium-free or lithium-deficient surface makes the prelithiated anode active material particle more air-stable and safer to handle.

In certain embodiments, the prelithiated anode active material particle further comprises a protecting shell, having a thickness from 0.5 nm to 5 μm (preferably from 1 nm to 2 μm and more preferably <1 μm) and a lithium ion conductivity from $10^{-8}$ S/cm to $5\times10^{-2}$ S/cm at room temperature. Such a protecting shell wraps around, embraces or encapsulates the anode active material particle.

The protecting shell may contain a polymer preferably selected from poly(ethylene oxide) (PEO), polypropylene oxide (PPO), poly(acrylonitrile) (PAN), poly(methyl methacrylate) (PMMA), poly(vinylidene fluoride) (PVdF), poly bis-methoxy ethoxyethoxide-phosphazenex, polyvinyl chloride, poly(vinylidene chloride), polydimethylsiloxane, poly (vinylidene fluoride)-hexafluoropropylene (PVDF-HFP), polyethylene glycol (PEG), a chemical derivative of PEG, poly(ethylene glycol diacrylate) (PEGDA), polyethylene glycol methyl ether, polyethylene glycol dimethyl ether, a sulfonated polymer, an interpenetrating polymer network thereof, or a combination thereof.

The interpenetrating polymer network (IPN) can include a simultaneous polymer interpenetrating network (S-IPN), a sequential IPN or semi-interpenetrating network (semi-IPN).

The sulfonated polymer may be selected from the group consisting of sulfonated polyaniline, sulfonated polypyrrole, sulfonated polythiophene, sulfonated polyfuran, a sulfonated bi-cyclic polymer, poly(perfluoro sulfonic acid), sulfonated poly (tetrafluoroethylene), sulfonated perfluoroalkoxy derivatives of polytetrafluoroethylene, sulfonated polysulfone, sulfonated poly(ether ketone), sulfonated poly (ether ether ketone), sulfonated polyimide, sulfonated styrene-butadiene copolymers, sulfonated polystyrene, sulfonated poly chlorotrifluoroethylene (PCTFE), sulfonated perfluoroethylene-propylene copolymer (FEP), sulfonated ethylene-chlorotrifluoroethylene copolymer (ECTFE), sulfonated poly vinylidenefluoride (PVDF), sulfonated copolymers of polyvinylidenefluoride with hexafluoropropene and tetrafluoroethylene, sulfonated copolymers of ethylene and tetrafluoroethylene (ETFE), sulfonated polybenzimidazole (PBI), their chemical derivatives, copolymers, blends, and combinations thereof.

The protecting shell comprises a lithium- or sodium-containing species dispersed therein and said lithium- or sodium-containing species is selected from $Li_2CO_3$, $Li_2C_2O_4$, LiOH, LiCl, LiI, LiBr, $ROCO_2Li$, HCOLi, ROLi, $(ROCO_2Li)_2$, $(CH_2OCO_2Li)_2$, $Li_2S$, $Li_xSO_y$, $Li_4B$, $Na_4B$, $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, a combination thereof, a combination thereof with $Li_2O$ or LiF, or a combination of $Li_2O$ and LiF, wherein X=F, Cl, I, or Br, R=a hydrocarbon group, $0<x\leq1$, $1\leq y\leq4$.

In some embodiments, the protecting shell comprises a lithium salt selected from lithium carbonate, $Li_2CO_3$, lithium hydroxide, LiOH, lithium halogenide (LiF, LiCl, LiI, or LiBr), lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

In certain other preferred embodiments, the anode active material particles are coated with a layer of carbon, graphene, electron-conducting polymer, or a combination thereof to form conductive material-coated particles prior to being embraced by the protecting shell.

Preferably, the anode active material particle is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; and (g) combinations thereof.

The maximum lithium content in an active material may be defined as the theoretical capacity of this material. For instance, when Si is fully charged with lithium, the resulting material may be represented by a formula $Li_{4.4}Si$, which indicates a maximum charge storage capacity of 4,200 mAh/g and corresponds to a lithium weight fraction of 57.4% based on the weight of this fully lithiated Si material. Other examples include $Li_{4.4}Ge$ (maximum capacity of Ge=1,623 mAh/g), $Li_{4.4}Sn$ (maximum capacity of Sn=993 mAh/g), $Li_3Cd$ (maximum capacity of Cd=715 mAh/g), $Li_3Sb$ (maximum capacity of Sb=660 mAh/g), $Li_{4.4}Pb$ (569 mAh/g), LiZn (410 mAh/g), and $Li_3Bi$ (385 mAh/g). In certain preferred embodiments, the particle of anode active material comprises a doped semiconductor material selected from Si or Ge doped with n-type and/or p-type dopants.

In the prelithiated anode active material, the particle may be in a form of nano particle, nano wire, nano fiber, nano tube, nano sheet, nano belt, nano ribbon, nano disc, nano platelet, or nano horn having a thickness or diameter from 0.5 nm to 100 nm. In certain embodiments, the particle contains a sub-micron or micron particle having a dimension (diameter or thickness) from 100 nm to 30 μm.

In certain embodiments, the anode particle is coated with a layer of carbon, graphene, electron-conducting polymer, ion-conducting polymer, or a combination thereof that is disposed between the anode particle and the protecting shell layer. In some embodiments, the protected anode particle further contains a layer of carbon, graphene, electron-conducting polymer, ion-conducting polymer, or a combination thereof that is coated on the protecting layer.

In a particularly desired embodiment, the anode active material comprises silicon and the prelithiated particle is selected from $Li_xSi$, wherein numerical x is from 0.01 to 4.4. The protecting shell may comprise a polymer layer comprising a lithium salt dispersed therein (i.e. dispersed in the protecting polymer layer) wherein the lithium salt is selected from lithium carbonate, $Li_2CO_3$, lithium hydroxide, LiOH, lithium halogenide (LiF, LiCl, LiI, or LiBr), lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

In certain embodiments, the protecting polymer layer may comprise a lithium- or sodium-containing species dispersed therein (i.e. dispersed in the protecting polymer layer) wherein the lithium- or sodium-containing species is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, $Li_4B$, $Na_4B$, $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, or a combination thereof, wherein X=F, Cl, I, or Br, R=a hydrocarbon group, $0<x\leq 1$, $1\leq y\leq 4$. The lithium- or sodium-containing species may be preferably derived from an electrochemical decomposition reaction.

The present disclosure also provides a mass of anode active material powder comprising multiple particulates of the afore-mentioned prelithiated anode active material (with or without a protecting shell). The disclosure also provides an anode electrode comprising the afore-mentioned prelithiated anode active material, an optional conductive additive, and an optional binder. Also provided is a lithium-ion or lithium metal battery containing such an anode electrode, a cathode electrode, and an electrolyte in ionic contact with the anode electrode and the cathode electrode.

In certain preferred embodiments, inside the protecting shell, the particles is coated with a layer of carbon, graphene, electron-conducting polymer, ion-conducting polymer, or a combination thereof that is disposed between the anode active material particles and the protecting polymer layer. Such a layer of carbon, graphene, electron-conducting polymer, ion-conducting polymer, or a combination thereof may be coated on surfaces of the protecting polymer layer.

Also provided is a particulate comprising a core and an encapsulating shell protecting the core, wherein the core comprises multiple anode active material particles wherein at least one of the multiple anode active material particles comprises the presently invented prelithiated anode active material particle. Preferably, most or all of these multiple particles are prelithiated anode active material particles described above.

The present disclosure also provides a method of producing multiple prelithiated anode active material particles described in the foregoing, the method comprising: (a) providing a plurality of particles of an anode active material; (b) prelithiating the particles to form prelithiated particles that each contains an amount of lithium from 1% to 100% of a maximum lithium content contained in the anode active material; and (c) partially de-lithiating the prelithiated particles by removing a desired amount of lithium from surfaces of the prelithiated particles.

In certain embodiments, the step of de-lithiating comprises electrochemically de-intercalating lithium from the prelithiated particles. Preferably, the step of de-lithiation is conducted to an extent that the lithium concentration on or near an anode particle surface is substantially zero. Typically, the step of de-lithiation results in a lithium concentration gradient wherein there is a first lithium concentration $C_1$ near a particle surface and a second lithium concentration $C_2$ inside the particle and away from the particle surface and wherein $C_1<C_2$.

The method may further comprise a step of depositing a protecting polymer layer to embrace at least one of the prelithiated particles, wherein the protecting polymer layer has a thickness from 0.5 nm to 5 μm, and a lithium ion conductivity from $10^{-8}$ S/cm to $5\times10^{-2}$ S/cm at room temperature.

The protecting polymer layer preferably contains a polymer selected from poly(ethylene oxide) (PEO), polypropylene oxide (PPO), poly(acrylonitrile) (PAN), poly(methyl methacrylate) (PMMA), poly(vinylidene fluoride) (PVdF), poly bis-methoxy ethoxyethoxide-phosphazenex, polyvinyl chloride, poly(vinylidene chloride), polydimethylsiloxane, poly(vinylidene fluoride)-hexafluoropropylene (PVDF-HFP), polyethylene glycol, polyethylene glycol methyl ether, polyethylene glycol dimethyl ether, a sulfonated polymer, or a combination thereof.

The sulfonated polymer may be selected from the group consisting of sulfonated polyaniline, sulfonated polypyrrole, sulfonated polythiophene, sulfonated polyfuran, a sulfonated bi-cyclic polymer, poly(perfluoro sulfonic acid), sulfonated poly (tetrafluoroethylene), sulfonated perfluoroalkoxy derivatives of polytetrafluoroethylene, sulfonated polysulfone, sulfonated poly(ether ketone), sulfonated poly (ether ether ketone), sulfonated polyimide, sulfonated styrene-butadiene copolymers, sulfonated polystyrene, sulfonated poly chlorotrifluoroethylene (PCTFE), sulfonated perfluoroethylene-propylene copolymer (FEP), sulfonated ethylene-chlorotrifluoroethylene copolymer (ECTFE), sulfonated poly vinylidenefluoride (PVDF), sulfonated copolymers of polyvinylidenefluoride with hexafluoropropene and tetrafluoroethylene, sulfonated copolymers of ethylene and tetrafluoroethylene (ETFE), sulfonated polybenzimidazole (PBI), their chemical derivatives, copolymers, blends, and combinations thereof.

The protecting polymer layer may further comprise a lithium- or sodium-containing species dispersed therein and wherein said lithium- or sodium-containing species is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, $Li_4B$, $Na_4B$, $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, or a combination thereof, wherein X=F, Cl, I, or Br, R=a hydrocarbon group, $0<x\leq1$, $1\leq y\leq4$.

In certain embodiments, the protecting polymer layer further comprises a lithium salt selected from lithium carbonate, $Li_2CO_3$, lithium hydroxide, LiOH, lithium halogenide (LiF, LiCl, LiI, or LiBr), lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl) imide, lithium bis(fluorosulfonyl)imide, lithium trifluoromethanesulfonimide (LiTFSI), an ionic liquid-based lithium salt, or a combination thereof.

In certain embodiments, the step of depositing a protecting polymer layer includes a procedure selected from pan-coating, air-suspension coating, centrifugal extrusion, vibration nozzle, spray-drying, oven or furnace drying, ionotropic gelation, coacervation-phase separation, interfacial polycondensation, interfacial cross-linking, in-situ polymerization, or matrix polymerization.

In the invented method, the anode active material particles are preferably selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; and (g) combinations thereof.

The step of prelithiating may include electrochemical prelithiation, chemical prelithiation, physical prelithiation, or a combination thereof. Preferably, the anode active material comprises silicon and the prelithiated particles comprise a prelithiated silicon represented by $Li_4Si$, $Li_{4.4}Si$, or $Li_xSi$, wherein numerical x is from 1 to 4.4.

The particles of an anode active material may comprise a doped semiconductor material selected from Si or Ge doped with n-type and/or p-type dopants.

The method may further comprise a step of coating a surface of the prelithiated particles with a thin layer of carbon, graphene, or electron-conducting polymer, having a thickness from 0.5 nm to 1 μm, prior to step (b) or step (c). The thin layer of carbon is obtained from pyrolization of a polymer, pitch, or organic precursor or obtained by chemical vapor deposition, physical vapor deposition, or sputtering.

The disclosure also provides a method of producing a lithium-ion battery comprising (A) preparing an anode from the prelithiated anode particles produced by the aforementioned method; and (B) combining the anode with a cathode, and an electrolyte to form the battery.

DETAILED DESCRIPTION OF PREFERRED EMBODIMENTS

Figure 1A:
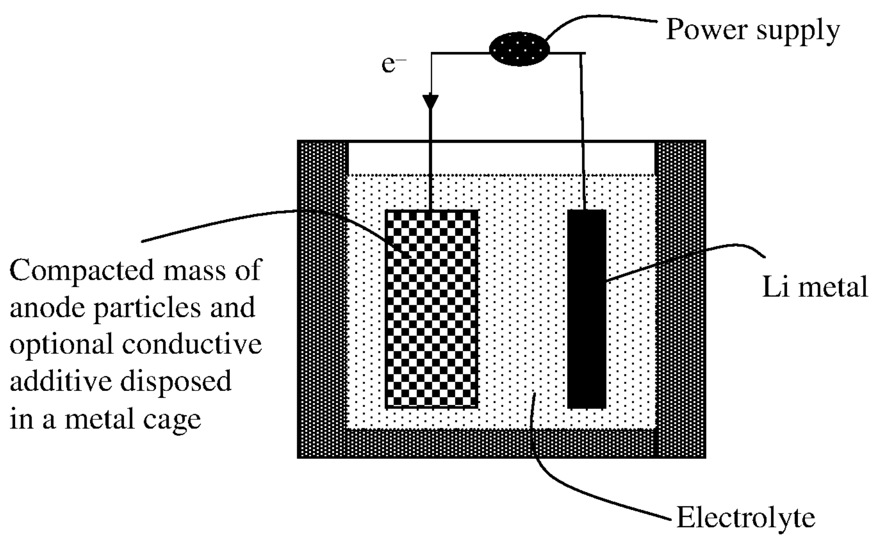
FIG. 1(A) Schematic of an electrochemical apparatus or reactor for prelithiating and then partially de-lithiating particles of an anode active material, according to a preferred embodiment of the present disclosure.

This disclosure is related to anode materials for high-capacity lithium batteries, which are preferably secondary batteries based on a non-aqueous electrolyte, a polymer gel electrolyte, polymer electrolyte, quasi-solid electrolyte, or solid-state electrolyte. The shape of a lithium metal or lithium ion battery can be cylindrical, square, button-like, etc. The present disclosure is not limited to any battery shape or configuration.

The present disclosure provides a prelithiated active material particle (and multiple prelithiated anode active material particles) for use in a lithium battery. The particle is capable of reversibly storing lithium ions therein during the charge and discharge of the battery and comprises an amount of lithium from 1% to 100% of a maximum lithium content that can be contained in the anode active material particle (e.g., in the case of Si, 100%=$Li_{4.4}Si$, wherein there are 4.4 Li atoms in 1 Si atom), having a first lithium concentration $C_1$ near the particle surface and a second lithium concentration $C_2$ inside the particle and away from the particle surface and wherein $C_1<C_2$. Preferably, the lithium concentration is substantially zero near or on the particle surface (i.e. $C_1\approx 0$). Typically, there is a lithium concentration gradient from substantially zero near the surface to a maximum concentration near the center of the anode particle. Such an essentially lithium-free or lithium-deficient surface of a prelithiated anode particle makes the prelithiated anode active material particle more air-stable and safer to handle.

In certain embodiments, the prelithiated anode active material particle further comprises a protecting shell, having a thickness from 0.5 nm to 5 μm (preferably from 1 nm to 2 μm and more preferably <1 μm) and a lithium ion conductivity from $10^{-8}$ S/cm to $5\times10^{-2}$ S/cm at room temperature. Such a protecting shell wraps around, embraces or encapsulates the anode active material particle.

The protecting shell may contain a polymer preferably selected from poly(ethylene oxide) (PEO), polypropylene oxide (PPO), poly(acrylonitrile) (PAN), poly(methyl methacrylate) (PMMA), poly(vinylidene fluoride) (PVdF), poly bis-methoxy ethoxyethoxide-phosphazenex, polyvinyl chloride, poly(vinylidene chloride), polydimethylsiloxane, poly (vinylidene fluoride)-hexafluoropropylene (PVDF-HFP), polyethylene glycol, polyethylene glycol methyl ether, polyethylene glycol dimethyl ether, an interpenetrating polymer network thereof, a sulfonated polymer, or a combination thereof.

In certain other preferred embodiments, the anode active material particles are coated with a layer of carbon, graphene, electron-conducting polymer, or a combination thereof to form conductive material-coated particles prior to being embraced by the protecting polymer layer.

The sulfonated polymer is preferably selected from the group consisting of sulfonated polyaniline, sulfonated polypyrrole, sulfonated polythiophene, sulfonated polyfuran, a sulfonated bi-cyclic polymer, poly(perfluoro sulfonic acid), sulfonated poly (tetrafluoroethylene), sulfonated perfluoroalkoxy derivatives of polytetrafluoroethylene, sulfonated polysulfone, sulfonated poly(ether ketone), sulfonated poly (ether ether ketone), sulfonated polyimide, sulfonated styrene-butadiene copolymers, sulfonated polystyrene, sulfonated poly chlorotrifluoroethylene (PCTFE), sulfonated perfluoroethylene-propylene copolymer (FEP), sulfonated ethylene-chlorotrifluoroethylene copolymer (ECTFE), sulfonated poly vinylidene fluoride (PVDF), sulfonated copolymers of polyvinylidene fluoride with hexafluoropropene and tetrafluoroethylene, sulfonated copolymers of ethylene and tetrafluoroethylene (ETFE), sulfonated polybenzimidazole (PBI), their chemical derivatives, copolymers, blends, and combinations thereof.

An interpenetrating polymer networks (IPN) consists of two or more chemically different networks, which are at least partially interlaced on a polymer scale but, in theory, are not covalently bonded to each other, although in practice some type of grafting between the networks can occur. One can also define: (i) semi-interpenetrating polymer networks (semi-IPN, containing networks and linear or branched polymer(s) that can be separated) and (ii) sequential semi-interpenetrating polymer networks. IPNs and semi-IPNs can be formed simultaneously or sequentially.

IPNs are synthesized from a blend of two multifunctional monomers that polymerize through two different routes (e.g., radical and cationic). This usually occurs according to a thermal process. However, photopolymerization techniques also can be used to produce IPNs. A photoinitiating system (PIS) containing at least one or two photoinitiators PI may be used to start the polymerization reactions.

Semi-interpenetrating polymer networks have also been obtained by UV curing of, e.g., acrylate monomers dispersed in a polymer matrix (polyurethane, polyvinyl chloride, polymethyl methacrylate, polybutadiene, polyisoprene), hyaluronic acid/hydroxyethyl methacrylate derivatized dextran (usable in 3D hydrogel bioprinted constructs). IPNs from acrylate/epoxidised polyisoprene blends have been reported.

IPNs have been prepared, e.g., from a trifunctional thiol/poly (ethylene glycol) (PEG)-diallyl blend via a thiol-ene coupling reaction. A mixture of poly (ethylene glycol) diacrylate (PEGDA) and hexanediol diacrylate (HDDA) monomers polymerized within a hexagonal liquid crystalline template may form an IPN-type material.

The protecting shell may contain a polymer comprising a lithium salt dispersed therein (i.e. dispersed in the protecting polymer layer) wherein the lithium salt is selected from lithium carbonate, $Li_2CO_3$, lithium hydroxide, LiOH, lithium halogenide (LiF, LiCl, LiI, or LiBr), lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoroethylsulfonylimide (LiBETI), lithium bis (trifluoromethanesulfonyl)imide, lithium bis(fluorosulfonyl) imide, lithium trifluoromethanesulfonimide (LiTFSI), an ionic liquid-based lithium salt, or a combination thereof.

In certain embodiments, the protecting polymer layer may comprise a lithium- or sodium-containing species dispersed therein (i.e. dispersed in the protecting polymer layer) wherein the lithium- or sodium-containing species is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, $Li_4B$, $Na_4B$, $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, or a combination thereof, wherein X=F, Cl, I, or Br, R=a hydrocarbon group, $0<x\leq1$, $1\leq y\leq4$. The lithium- or sodium-containing species may be preferably derived from an electrochemical decomposition reaction.

For a lithium ion battery, according to a preferred embodiment of the present disclosure, the starting anode active material (in a fine powder form) may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; and (g) combinations thereof.

Prelithiation can be accomplished in several different ways that can be classified into 3 categories: physical methods, electrochemical methods, and chemical methods. The chemical methods are typically conducted by sourcing lithium atoms from active reactants or lithium metal. The active reactants can include organometallic compounds and lithium salts and the reactions can be effectuated ex-situ (in a chemical reactor before anode fabrication, or after anode fabrication but before cell assembly). One may also bring lithium metal in direct contact with particles of the desired anode active material in a dry condition or with the presence of a liquid electrolyte.

A physical process entails depositing a Li coating on a surface of an anode active material substrate (e.g., a layer of fine Si particles), followed by promoting thermally induced diffusion of Li into the substrate (e.g., into the interior of a Si particles). A thin lithium layer can be deposited on the surface of an anode material substrate using a standard thin film process, such as thermal evaporation, electron beam evaporation, sputtering, and laser ablation. A vacuum is used during the deposition process to avoid reactivity between the atomic lithium and molecules of lithium-reactive substances such as water, oxygen, and nitrogen. A vacuum of greater than 1 milli-Torr is desirable. When electron beam deposition is used a vacuum of $10^{-4}$ Torr is desired and a vacuum of $10^{-6}$ Torr is preferred to avoid interaction between the electron beam and any residual air molecules.

The evaporative deposition techniques involve the heating of a lithium metal to create a lithium vapor. The lithium metal can be heated by an electron beam or by resistive heating of the lithium metal. The lithium vapor deposits lithium onto a substrate composed of packed Si particles. To promote the deposition of lithium metal the substrate can be cooled or maintained at a temperature lower than the temperature of the lithium vapor. A thickness monitor such as a quartz crystal type monitor can be placed near the substrate to monitor the thickness of the film being deposited. Alternatively, laser ablation and sputtering techniques can be used to promote thin lithium film growth on a substrate. For example, argon ions can be used in the sputtering process to bombard a solid lithium metal target. The bombarding knocks lithium off of the target and deposits it on the surface of a substrate. Laser ablation processes can be used to knock lithium off of a lithium target. The separated lithium atoms are then deposited onto the substrate. The lithium-coated layer of packed Si particles (as an example of an anode active material) is then immersed into a liquid electrolyte containing a lithium salt dissolved in an organic solvent. Lithium atoms rapidly permeate into the bulk of Si particles to form prelithiated Si particles. Physical methods may also be conducted by simply mixing molten lithium metal with particles of the anode active materials (e.g. Si, Ge, SiO, $CO_3O_4$, Sn, $SnO_2$, $ZnCo_2O_4$, etc.).

A more preferred pre-lithiation process involves electrochemically forcing Li atoms to migrate into the bulk of multiple Si or graphite particles under the influence of an electromotive force (emf). In a typical arrangement (as schematically illustrated in FIG. 1(A)), again using Si as an example, a compacted mass of Si (having carbon particles as a conductive additive mixed with these Si particles or having individual Si particles coated with a carbon material or embraced with graphene sheets) is used as a positive electrode and Li metal sheet or rod as a negative electrode in the electrochemical reactor. The two electrodes are then immersed in a liquid electrolyte containing a lithium salt dissolved in an organic solvent. An electric current is then applied between the anode and the cathode. This is similar to an electro-plating procedure, but, surprisingly, Li atoms are capable of permeating into the bulk of the Si or graphite particles. For electro-chemical lithiation of Si or graphite particles, the particles may be confined in a porous container (e.g., fine metal mesh) that is permeable to electrolyte, but does not allow solid Si or graphite particles to escape. The fine metal mesh serves as a working electrode while a lithium metal rod or sheet serves as a counter electrode. The entire set-up is preferably immersed in a liquid electrolyte contained in an electrochemical reactor.

Figure 1B:
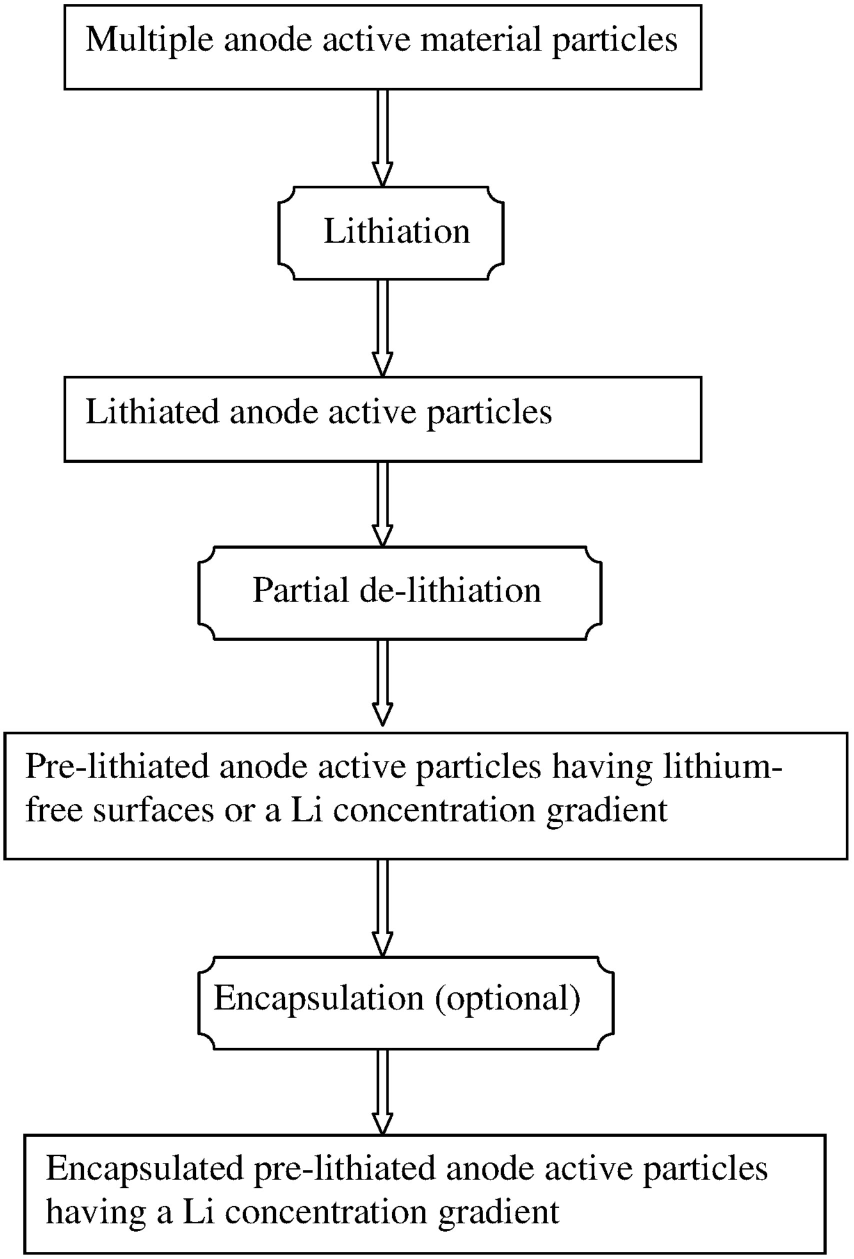
FIG. 1(B) Schematic of an electrochemical process for prelithiating and then partially de-lithiating particles of an anode active material, according to a preferred embodiment of the present disclosure.

After the anode active material particles (e.g. Si or graphite) are pre-lithiated to a desired extent (e.g. up to the full lithium storage capacity of Si or graphite), the electric current can be reversed in polarity (e.g. instead of pumping electrons into the Si/graphite electrode, electrons are drawn out of the Si/graphite electrode). This is analogous to de-plating or de-intercalation of lithium from the Si/graphite electrode. This process is summarized in FIG. 1(B) according to some embodiments of the presently disclosed method. Such a procedure is conducted to remove lithium from the surface zone of an anode active material particle (Si or graphite particle) so that the particle surface is substantially lithium-free, making the anode active particle more air-stable and safer.

Preferably, the lithium salt in the liquid electrolyte during the procedure of lithiating or de-lithiating is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), or a combination thereof. It may be noted that these metal salts are also commonly used in the electrolytes of rechargeable lithium batteries.

The electrolytes used in this electrochemical reactor for lithiating and de-lithiating may contain a solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof. These solvents are also commonly used in the electrolytes of rechargeable lithium batteries.

The aforementioned prelithiation processes are applicable to all of the anode active materials discussed in the present specification, not just Si and graphite, although Si and graphite are used as an example to illustrate the best-mode practice. The anode active material preferably comprises silicon and the prelithiated particles comprise a prelithiated silicon, represented by $Li_4Si$, $Li_{4.4}Si$, or $Li_xSi$, wherein numerical x is between 1 and 4.4. The step of providing an anode active material may comprise providing a doped semiconductor material. Such a doped semiconductor material may be selected from Si or Ge doped with n-type and/or p-type dopants. Commonly used n-type dopants are P, As, and Sb and commonly used p-type dopants are Al, Ga, and In.

The prelithiated anode active material particles are then subjected to a deposition treatment that forms a protecting polymer layer to embrace the prelithiated particles. The same deposition treatment also applies to un-prelithiated particles and those particles that have been coated with a thin layer (0.5 nm to 2 μm in thickness) of carbon, graphene, electron-conducting polymer, etc.).

The protective polymer layer described in this disclosure typically exhibits a lithium ion or sodium ion conductivity from $1.0\times10^{-8}$ S/cm to $5.0\times10^{-2}$ S/cm, more typically from $1\times10^{-7}$ S/cm to $5\times10^{-3}$ S/cm, and further more typically $>10^{-5}$ S/cm, and most typically and preferably $>10^{-4}$ S/cm. The protecting polymer may be cast into a thin film to allow for ion conductivity measurement.

Several micro-encapsulation processes can be used to partially or fully embrace or encapsulate particles of an anode active material (with or without prelithiation) with a protective polymer layer. It may be noted that the feature of having surfaces being substantially lithium-free makes it safer and more convenient to carry out these micro-encapsulation processes. Liquid-based micro-encapsulation processes typically require dissolution of a polymer (or its precursor) (and, optionally, a lithium salt, a sodium salt, multiple lithium salts, and/or multiple sodium salts) in a solvent (including mixture of multiple solvents) to form a solution. This solution can then be used to encapsulate solid particles via several of the micro-encapsulation methods to be discussed in what follows.

There are three broad categories of micro-encapsulation methods that can be implemented to produce encapsulated particles of an anode active material: physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation or other surface reactions. Several methods are discussed below as examples.

Pan-coating method: The pan coating process involves tumbling the active material particles in a pan or a similar device while the encapsulating material (e.g. highly concentrated solution of Li/Na salts in a solvent) is applied slowly until a desired encapsulating shell thickness is attained.

Air-suspension coating method: In the air suspension coating process, the solid particles (core material) are dispersed into the supporting air stream in an encapsulating chamber. A controlled stream of a salt-solvent solution (with an optional polymer) is concurrently introduced into this chamber, allowing the solution to hit and coat the suspended particles. These suspended particles are encapsulated (fully coated) with the salts while the volatile solvent is removed, leaving a very thin layer of Li and/or Na salts on surfaces of these particles. This process may be repeated several times until the required parameters, such as full-coating thickness (i.e. encapsulating shell or wall thickness), are achieved. The air stream which supports the particles also helps to dry them, and the rate of drying is directly proportional to the temperature of the air stream, which can be adjusted for optimized shell thickness.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating shell thickness is achieved.

Centrifugal extrusion: Anode active materials may be encapsulated using a rotating extrusion head containing concentric nozzles. In this process, a stream of core fluid (slurry containing particles of an anode active material dispersed in a solvent) is surrounded by a sheath of shell solution or melt. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational nozzle method: Core-shell encapsulation of an anode active material can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the anode active material. The solidification can be done according to the used gelation system with an internal gelation (e.g. sol-gel processing, melt) or an external (additional binder system, e.g. in a slurry).

Spray-drying: Spray drying may be used to encapsulate particles of an active material when the active material is suspended in a melt or polymer solution. In spray drying, the liquid feed (solution or suspension) is atomized to form droplets which, upon contacts with hot gas, allow solvent to get vaporized and thin polymer shell to fully embrace the solid particles of the active material.

Coacervation-phase separation: This process consists of three steps carried out under continuous agitation:

(a) Formation of three immiscible chemical phases: liquid manufacturing vehicle phase, core material phase and encapsulation material phase. The core material is dispersed in a solution of the encapsulating polymer (elastomer or its monomer or oligomer). The encapsulating material phase, which is an immiscible polymer in liquid state, is formed by (i) changing temperature in polymer solution, (ii) addition of salt, (iii) addition of non-solvent, or (iv) addition of an incompatible polymer in the polymer solution.

(b) Deposition of encapsulation shell material: core material being dispersed in the encapsulating polymer solution, encapsulating polymer material coated around core particles, and deposition of liquid polymer embracing around core particles by polymer adsorbed at the interface formed between core material and vehicle phase; and (c) Hardening of encapsulating shell material: shell material being immiscible in vehicle phase and made rigid via thermal, cross-linking, or dissolution techniques.

Interfacial polycondensation and interfacial cross-linking: Interfacial polycondensation entails introducing the two reactants to meet at the interface where they react with each other. This is based on the concept of the Schotten-Baumann reaction between an acid chloride and a compound containing an active hydrogen atom (such as an amine or alcohol), polyester, polyurea, polyurethane, or urea-urethane condensation. Under proper conditions, thin flexible encapsulating shell (wall) forms rapidly at the interface. A solution of the anode active material and a diacid chloride are emulsified in water and an aqueous solution containing an amine and a polyfunctional isocyanate is added. A base may be added to neutralize the acid formed during the reaction. Condensed polymer shells form instantaneously at the interface of the emulsion droplets. Interfacial cross-linking is derived from interfacial polycondensation, wherein cross-linking occurs between growing polymer chains and a multi-functional chemical groups to form an elastomer shell material.

In-situ polymerization: In some micro-encapsulation processes, active materials particles are fully coated with a monomer or oligomer first. Then, direct polymerization of the monomer or oligomer is carried out on the surfaces of these material particles.

Matrix polymerization: This method involves dispersing and embedding a core material in a polymeric matrix during formation of the particles. This can be accomplished via spray-drying, in which the particles are formed by evaporation of the solvent from the matrix material. Another possible route is the notion that the solidification of the matrix is caused by a chemical change.

It may be noted that the anode active material (e.g., prelithiated or non-lithiated Si nano particles) may be coated with a carbonizable coating material (e.g., phenolic resin, poly(furfuryl alcohol), coal tar pitch, or petroleum pitch). The coating can then be carbonized to produce an amorphous carbon or polymeric carbon coating on the surface of these Si particles. Such a conductive surface coating can help maintain a network of electron-conducting paths during repeated charge/discharge cycles and prevent undesirable chemical reactions between Si and electrolyte from happening. Hence, the presently invented method may further comprise a step of coating a surface of the fine particles with a thin layer of carbon having a thickness less than 1 μm prior to the formation of the protective layer. The thin layer of carbon preferably has a thickness less than 100 nm. Such a thin layer of carbon may be obtained from pyrolization of a polymer, pitch, or organic precursor or obtained by chemical vapor deposition, physical vapor deposition, sputtering, etc.

Alternatively, the particles of an anode active material may be coated with a layer of graphene, electron-conducting polymer, or ion-conducting polymer. Such coating processes are well-known in the art. These coated particles are then subjected to pre-lithiation and then partial de-lithiation.

In the preparation of an anode electrode, acetylene black (AB), carbon black (CB), or ultra-fine graphite particles may be used as a conductive additive. Conductive additives may comprise an electrically conductive material selected from the group consisting of electro-spun nano fibers, carbonized electro-spun nano fibers, vapor-grown carbon or graphite nano fibers, carbon or graphite whiskers, carbon nano-tubes, nano-scaled graphene platelets, metal nano wires, metal-coated nano wires, carbon-coated nano wires, metal-coated nano fibers, carbon-coated nano fibers, and combinations thereof. A binder material may be chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, meso-phase pitch, coal tar pitch, and petroleum pitch may also be used as a binder. A typical mixing ratio of these ingredients is 80 to 85% by weight for the anode active material, 5 to 15% by weight for the conductive additive, and 5 to 10% by weight for the binder. The current collector may be selected from aluminum foil, stainless steel foil, and nickel foil. There is no particularly significant restriction on the type of current collector, provided the material is a good electrical conductor and relatively corrosion resistant. The separator may be selected from a polymeric nonwoven fabric, porous polyethylene film, porous polypropylene film, or porous PTFE film.

The electrode fabrication may comprise combining multiple fine particles of prelithiated anode active material with a conductive additive and/or a binder material, plus a desired amount of another type of anode active materials selected from particles of graphite, hard carbon, soft carbon, meso-carbon micro-bead, surface-modified graphite, carbon-coated graphite, or a combination thereof.

Hence, a lithium ion battery may contain an anode that comprises at least two types of anode active material wherein at least one type of active material is prelithiated (e.g., Si and Sn) and at least one type of active material is not prelithiated (e.g., carbonaceous material, such as graphite, hard carbon, soft carbon, surface-modified graphite, chemically modified graphite, or meso-carbon micro-beads, MCMBs). Fully prelithiated anode active materials are generally unstable in regular room air, unless partially de-lithiated to have substantially lithium-free surfaces. The present disclosure enable the battery to contain an anode that comprises at least a non-carbon active material possessing an ultra-high lithium absorbing capacity (e.g., Si that exhibits a specific capacity up to 4,200 mAh/g). The battery comprises an anode that contains an extra amount of lithium to compensate for the formation of SEI layers, in addition to providing enough lithium to intercalate into (or form a compound with) a cathode active material.

The present disclosure allows the extra amount of lithium to be safely stored in an anode active material. The capacity limitation is on the cathode side, rather than the anode side. The present approach obviates the need for the cathode to supply the needed lithium, thereby further reducing the needed initial weight of the cathode or increasing the cathode weight that can be incorporated in a cell. This strategy can increase the overall capacity of a lithium ion battery by another 20%-30%.

There is no limitation on the types of cathode materials that can pair up with the presently invented anode materials. The positive electrode (cathode) active material may be selected from both lithium-free and lithium-containing materials. For instance, the cathode active material may be selected from a wide variety of metal oxides, such as lithium-containing nickel oxide, lithium-containing cobalt oxide, lithium-containing nickel-cobalt oxide, lithium-containing vanadium oxide, lithium iron phosphate, lithium manganese phosphate, lithium manganese-iron phosphate, and other lithium metal (or mixed metals) phosphate. Positive electrode active material may also be selected from chalcogen compounds, such as titanium disulfate or molybdenum disulfate. More preferred are lithium cobalt oxide (e.g., $Li_xCoO_2$ where $0.8 \leq x \leq 1$), lithium nickel oxide (e.g., $LiNiO_2$), lithium manganese oxide (e.g., $LiMn_2O_4$ and $LiMnO_2$), lithium iron phosphate, lithium manganese-iron phosphate, lithium vanadium phosphate because these oxides provide a relatively high cell voltage and relatively good cycling stability.

Lithium cobalt oxide ($LiCoO_2$) is one of the most important cathode materials used in lithium-ion secondary batteries. $LiCoO_2$ and other similar lithium transition metal oxides, such as lithium manganese oxide, lithium nickel oxide, and lithium vanadium oxide, can be prepared by various methods using different lithium and transition metal sources. In general, bulk transition metal oxides are prepared by solid-state reactions, which involve repeated heat processes at high temperatures. Such processes generally afford the thermodynamically more stable phases and in general, microcrystalline materials are obtained. Lower temperatures and mild processing conditions may be used for several methods, such as co-precipitation, sol-gel process with/without template, synthesis by precursor, ion-exchange reaction and hydrothermal. These methods also result in particles with better control of morphology and smaller size. Other methods include flame spray pyrolysis, dehydro-freezing evaporation, supercritical dehydration, supersonic hydrothermal synthesis, and ultrasonic processing.

As an example, a process for producing lithium-cobalt oxide my include (a) mixing cobalt oxide having an average particle size of not more than 0.1 μm, with a lithium compound; and (b) calcining the obtained mixture at a temperature of 500 to 850° C. As compared to the conventional processes that begin with larger cobalt oxide particles (e.g., diameter >10 μm), such a process is advantageous in that lithium-cobalt oxide particles (1) can be produced with a short calcination time, (2) have a narrow particle size distribution, and (3) have a uniform small particle size.

The flame-spray pyrolysis method may include the steps of: (a) spraying minute droplets containing a solution of dissolved lithium salt and cobalt salt at room temperature; (b) atomizing the minute droplets through rapid expansion into a high temperature environment generated by combusting oxygen and hydrogen; (c) decomposing and oxidizing the atomized minute droplets thermally at high temperature to produce nano-sized oxides in gaseous phase; and (d) collecting the produced nano-sized composite oxides particles.

Lithium iron phosphate $LiFePO_4$ is a promising candidate of cathode material for lithium-ion batteries. The advantages of $LiFePO_4$ as a cathode active material includes a high theoretical capacity (170 mAh/g), environmental benignity, low resource cost, good cycling stability, high temperature capability, and prospect for a safer cell compared with $LiCoO_2$. A major drawback with this material is that it has very low electronic conductivity, on the order of $10^{-9}$ S/cm$^2$. This renders it difficult to prepare cathodes capable of operating at high rates. In addition, poor solid-phase transport means that the utilization of the active material is a strong function of the particle size. This major problem may be overcome by using a nano-scaled powder (to reduce the Li ion diffusion path and electron transport path distance) and doping the powder with a transition metal. Lithium iron phosphate ($LiFePO_4$) nano particles may be prepared by ball milling of conventional micron-sized particles, which may be prepared by a solid state reaction using $LiOH \cdot H_2O$, $(CH_3COO)_2Fe$, and $NH_4H_2PO_4$ as raw materials. Additionally, $Li_{1.3}Al_{0.3}Ti_{1.7}(PO_4)_3$ materials, as an example of lithium mixed-metal phosphate, may be successfully prepared by the solution deposition using lithium acetate, aluminum nitrate, ammonium dihydrogen phosphate and titanium butoxide as starting materials. The resulting material may be ball-milled to sub-micron or nanometer scales. This is but one example of a host of complex metal phosphate-based cathode materials.

A wide range of electrolytes can be incorporated into the lithium cells. Most preferred are non-aqueous and polymer gel electrolytes although other types can be used. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range from 30% to 80%. By selecting the volume ratio of MEC from the range of 30% to 80%, more preferably 40% to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably from 0.5 to 2.0 mol/l.

Example 1: Cobalt Oxide ($Co_3O_4$) Anode Particles Enhanced by Pre-Lithiated Graphite Particles An appropriate amount of inorganic salts $Co(NO_3)_2 \cdot 6H_2O$ and ammonia solution ($NH_3 \cdot H_2O$, 25 wt. %) were mixed together. The resulting suspension was stirred for 2 hours under an argon flow to ensure a complete reaction. The obtained $Co(OH)_2$ precursor suspension was calcined at 450° C. in air for 2 h to form particles of the layered $Co_3O_4$. Portion of the $Co_3O_4$ particles was then encapsulated with a phenolic resin, which was then carbonized at 500° C. for 2 hours and 900° C. for another 2 hours.

Samples of carbon-coated $Co_3O_4$ particles and artificial graphite particles, separately, were then electrochemically lithiated to produce prelithiated particles, which were then partially de-lithiated to create a lithium concentration gradient (from particle surface to the interior). Some of the prelithiated particles and, separately, some of the non-lithiated particles were then surface-protected by a layer of PEO using a pan-coating method.

For electrochemical testing, the working electrodes were prepared by mixing 85 wt. % active material (carbon-protected or non-protected, prelithiated or non-lithiated particulates of $Co_3O_4$), 7 wt. % graphite particles (prelithiated or non-thiated), and 8 wt. % polyvinylidene fluoride (PVDF) binder dissolved in N-methyl-2-pyrrolidinoe (NMP) to form a slurry of 5 wt. % total solid content. After coating the slurries on Cu foil, the electrodes were dried at 120° C. in vacuum for 2 h to remove the solvent before pressing. Then, the electrodes were cut into a disk ($\phi$=12 mm) and dried at 100° C. for 24 h in vacuum. Electrochemical measurements were carried out using CR2032 (3V) coin-type cells with lithium metal as the counter/reference electrode, Celgard 2400 membrane as separator, and 1 M $LiPF_6$ electrolyte solution dissolved in a mixture of ethylene carbonate (EC) and diethyl carbonate (DEC) (EC-DEC, 1:1 v/v). The cell assembly was performed in an argon-filled glove-box. The CV measurements were carried out using an electrochemical workstation at a scanning rate of 1 mV/s.

The electrochemical performance of the particulates of prelithiated $Co_3O_4$ particles and that of non-prelithiated $Co_3O_4$ were evaluated by galvanostatic charge/discharge cycling at a current density of 50 mA/g, using an electrochemical workstation.

Figure 2:
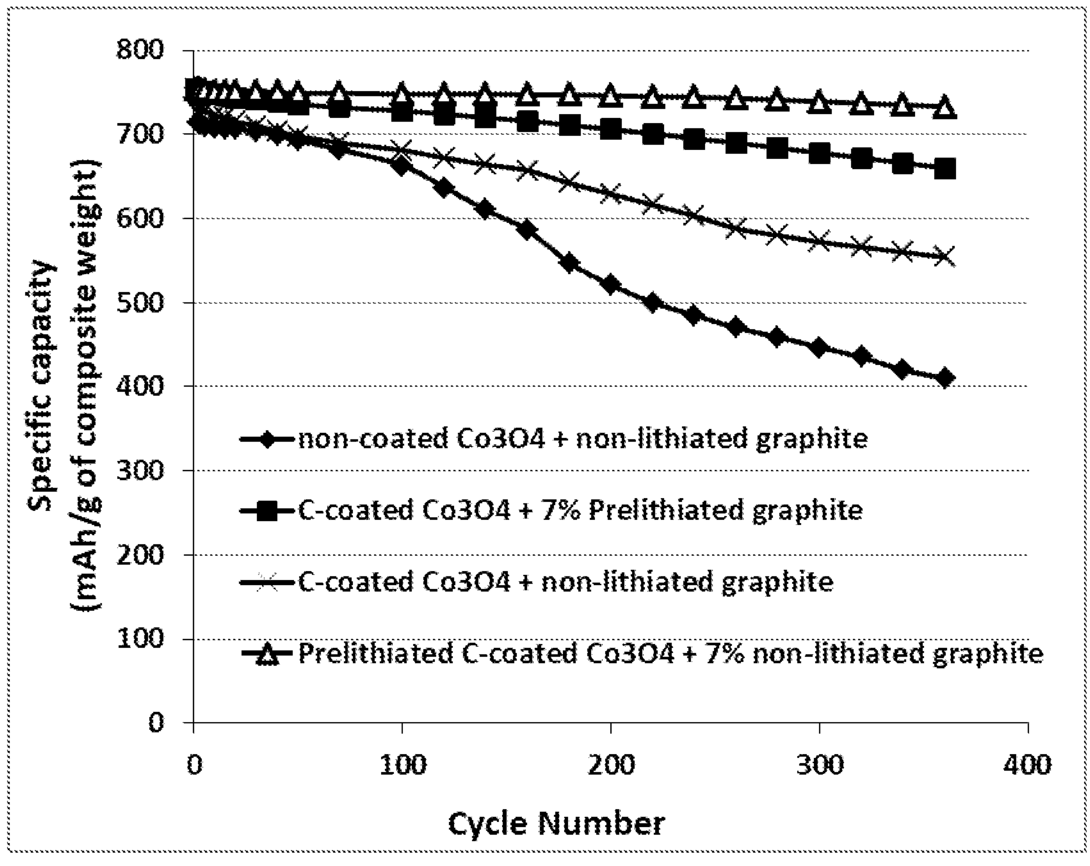
FIG. 2 The specific capacities of 4 lithium batteries: one having an anode active material featuring carbon-coated $Co_3O_4$ particles (non-lithiated) and 7% by weight of prelithiated graphite (having a lithium concentration gradient), one having pre-lithiated carbon-coated $Co_3O_4$ particles (having a lithium concentration gradient) and 7% by weight of non-lithiated graphite, one having carbon-coated $Co_3O_4$ particles and 7% non-prelithiated graphite, and one having un-protected $Co_3O_4$ particles and 7% non-prelithiated graphite.

Summarized in FIG. 2 are the specific capacities of 4 lithium batteries as a function of the charge/discharge numbers: one having an anode active material featuring carbon-coated $Co_3O_4$ particles (non-lithiated) and 7% by weight of prelithiated graphite (having a lithium concentration gradient), one having pre-lithiated carbon-coated $Co_3O_4$ particles (having a lithium concentration gradient) and 7% by weight of non-lithiated graphite, one having carbon-coated $Co_3O_4$ particles and 7% non-prelithiated graphite, and one having un-protected $Co_3O_4$ particles and 7% non-prelithiated graphite.

The testing results indicate that the first-cycle lithium insertion capacities for all the $Co_3O_4$-based anode active materials are 752-756 mAh/g, which are higher than the theoretical values of graphite (372 mAh/g). All cells, except for the one containing the polymer-stabilized and prelithiated $Co_3O_4$, exhibit some first-cycle irreversibility. The initial capacity loss likely has resulted mainly from the formation of solid electrolyte interface (SET) layers on the surfaces of anode active material particles.

As the number of cycles increases, the specific capacity of the bare $Co_3O_4$ electrode drops precipitously. Compared with its initial capacity value of approximately 755 mAh/g, its capacity suffers a 20% loss after 145 cycles and a 45.7% loss after 360 cycles. By contrast, the presently invented surface-protected and prelithiated $Co_3O_4$ particles provide the battery cell with a very stable and high specific capacity for a large number of cycles, experiencing a capacity loss of less than 2.7% after 360 cycles. The polymer-stabilized $Co_3O_4$ particles (with carbon coating but without prelithiation), when assisted with prelithiated graphite particles, enable the cell to sustain a 12.36% capacity loss after 360 cycles. When no prelithiated particles are present, the cell suffers a 26.5% capacity loss after 360 cycles. These data have clearly demonstrated the surprising and superior performance of the presently invented electrode materials containing prelithiated anode particles compared with prior art anode materials containing no prelithiated particles.

It may be noted that the number of charge-discharge cycles at which the specific capacity decays to 80% of its initial value is commonly defined as the useful cycle life of a lithium-ion battery. Thus, the cycle life of the cell containing the non-encapsulated anode active material is approximately 145 cycles. In contrast, the cycle life of the presently invented cells (not just button cells, but large-scale full cells) is typically from 1,800 to 4,500.

Example 2: Polymer-Stabilized Prelithiated Tin Oxide Particles

Tin oxide ($SnO_2$) nano particles were obtained by the controlled hydrolysis of $SnCl_4 \cdot 5H_2O$ with NaOH using the following procedure: $SnCl_4 \cdot 5H_2O$ (0.95 g, 2.7 m-mol) and NaOH (0.212 g, 5.3 m-mol) were dissolved in 50 mL of distilled water each. The NaOH solution was added drop-wise under vigorous stirring to the tin chloride solution at a rate of 1 mL/min. This solution was homogenized by sonication for 5 m in. Subsequently, the resulting hydrosol was reacted with $H_2SO_4$. To this mixed solution, few drops of 0.1 M of $H_2SO_4$ were added to flocculate the product. The precipitated solid was collected by centrifugation, washed with water and ethanol, and dried in vacuum. The dried product was heat-treated at 400° C. for 2 h under Ar atmosphere.

Samples of various different tin oxide particles were subjected to electrochemical prelithiation using lithium hexafluorophosphate ($LiPF_6$) as the salt dissolved in EC-PC (50/50) as an electrolyte solution and lithium metal as a counter-electrode. The prelithiated particles were subjected to a partial de-lithiation treatment (by reversing the electrical current direction) to produce particles having a lithium concentration gradient. Both prelithiated and non-prelithiated $SnO_2$ particles were then dispersed in a poly(acrylonitrile) (PAN)-solvent solution, Subsequently, PAN-protected $SnO_2$ particles were produced using spray-drying.

Figure 3:
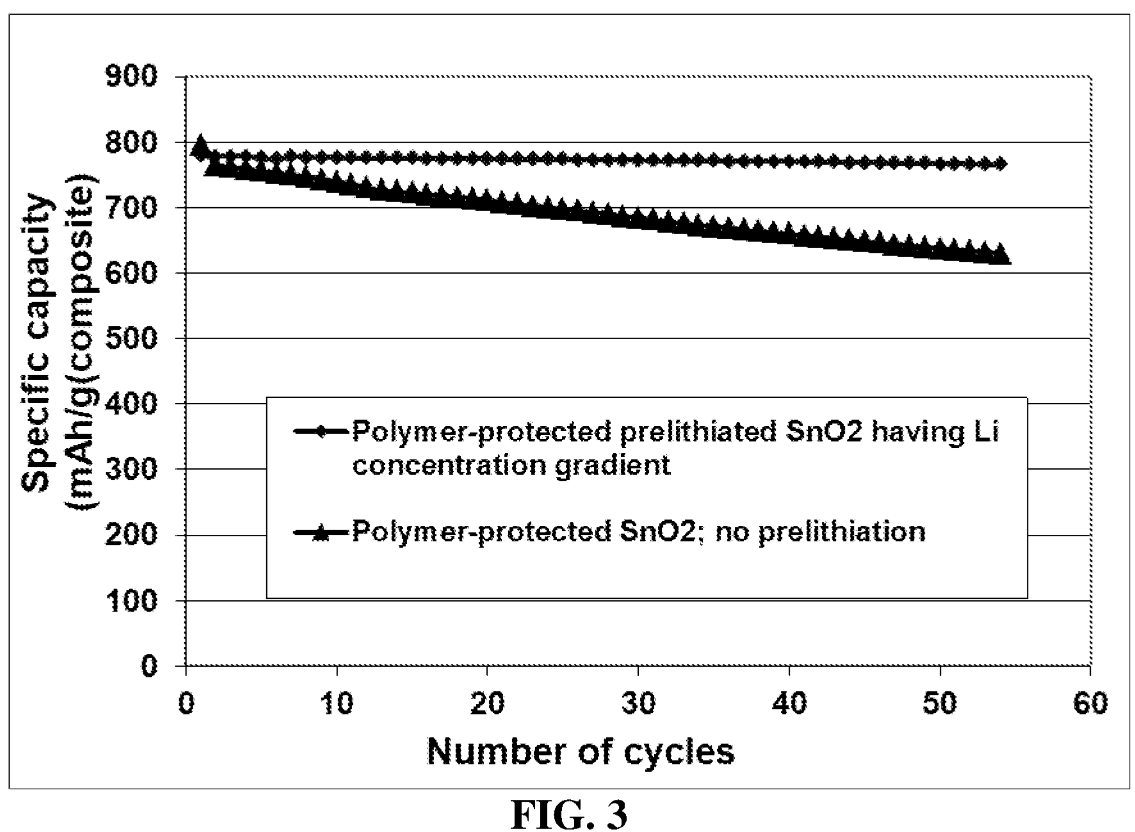
FIG. 3 The specific capacities of two lithium batteries one having an anode active material featuring $SnO_2$ particles that are polymer-protected and prelithiated, having a lithium concentration gradient, and the other, polymer-protected but not prelithiated.

The battery cells from these nano-scaled $SnO_2$ particles (with or without surface protection species or prelithiation) were prepared using a procedure described in Example 1. Shown in FIG. 3 are the specific capacities of two lithium batteries—one having an anode active material featuring $SnO_2$ particles that are polymer-protected and prelithiated, having a lithium concentration gradient, and the other, polymer-protected but not prelithiated. The anode prepared according to the presently invented polymer protection and prelithiation approach offers more stable cycling behavior and higher reversible capacity.

Example 3: Polymer-Stabilized Prelithiated Tin (Sn) Nano Particles

Nano particles (76 nm in diameter) of Sn were encapsulated with a thin layer of phenolic resin shell via the spray-drying method, followed by a heat treatment from 350-600° C. for 4 hours to obtain carbon-coated Sn nano particles. Half of these C-coated Sn particles were subjected to prelithiation, partial delithiation, and encapsulation by polyethylene glycol methyl ether (PEG-me) by dispersing the carbon-coated and prelithiated Sn nano particles in a PEG-me/ethanol solution, followed by spray-drying. Non-prelithiated Sn nano particles from the same batch were also investigated to determine and compare the cycling behaviors of the lithium-ion batteries containing these particles as the anode active material.

Figure 4:
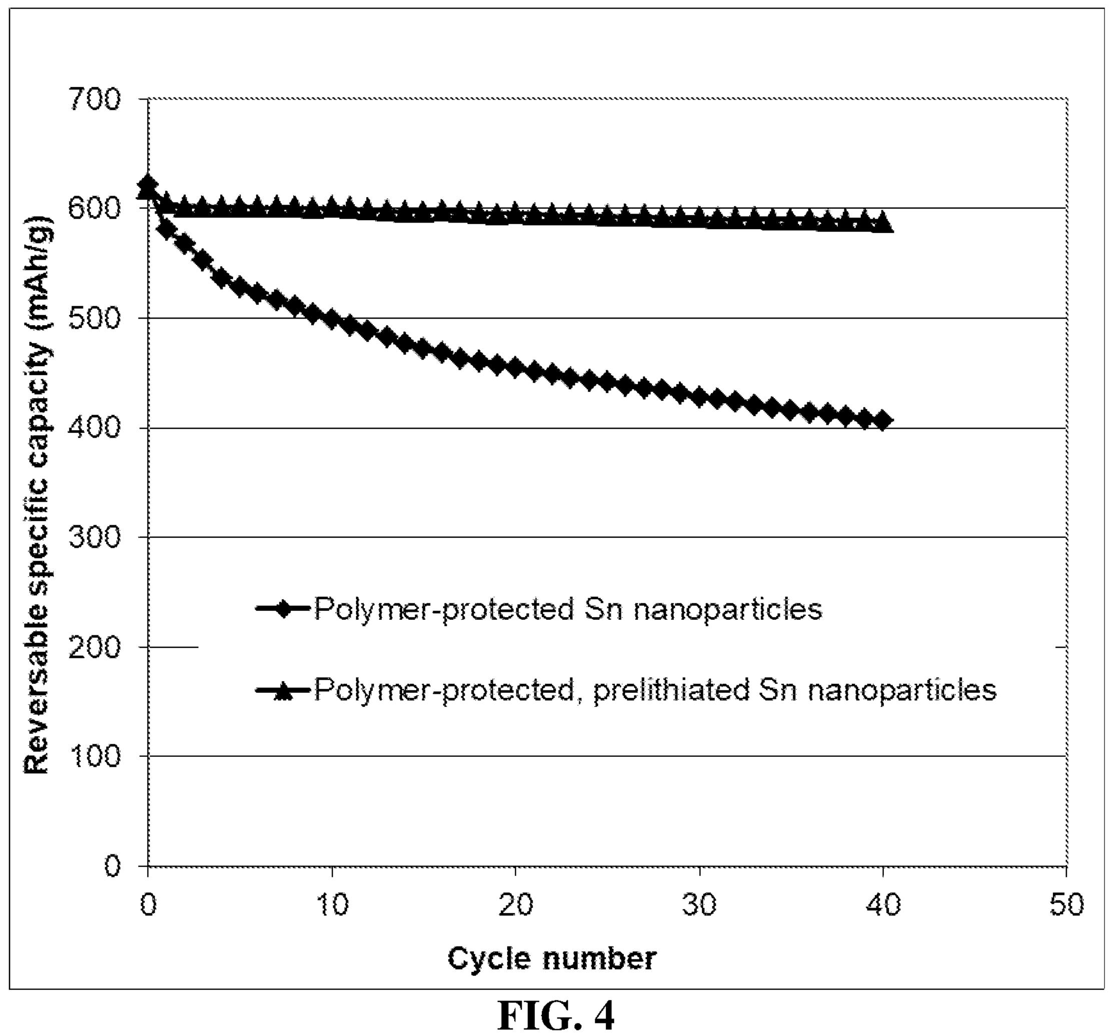
FIG. 4 The specific capacities of two lithium batteries: one having an anode active material featuring polymer-protected prelithiated Sn particles having a lithium concentration gradient and the other having polymer-encapsulated Sn particles, but no prelithiation.

Shown in FIG. 4 are the specific capacities of two lithium batteries: one having an anode active material featuring polymer-protected prelithiated Sn particles having a lithium concentration gradient and the other having polymer-encapsulated Sn particles, but no prelithiation. These results have clearly demonstrated that the presently invented prelithiation and encapsulation of carbon-coated Sn particles by a polymer protecting layer provides excellent protection against capacity decay of a lithium-ion battery. Carbon encapsulation is not good enough to provide the necessary protection.

Example 4: Surface-Protected Prelithiated Si Nanowire-Based Anode Materials

Si nanowires, having a diameter range from 19 to 28 nm, were supplied from Angstron Energy Co. (Dayton, Ohio). Some Si nanowires were coated with a layer of graphene sheets using spray-drying of Si nanowire/graphene oxide/water suspension. The graphene-coated Si nanowires were then prelithiated and partially de-lithiated using an electrochemical prelithiation procedure. Some prelithiated Si nano wires were further encapsulated by a thin layer of PPO composite containing $Li_2O$ and LiF dispersed therein. For comparison purposes, Si nanowires protected by graphene coating (but no prelithiation) were also prepared and implemented in a separate lithium-ion cell. In all the cells, approximately 20% of non-lithiated graphite particles were mixed with the Si nanowires (SiNW), along with 5% binder resin, to make an anode electrode.

Figure 5:
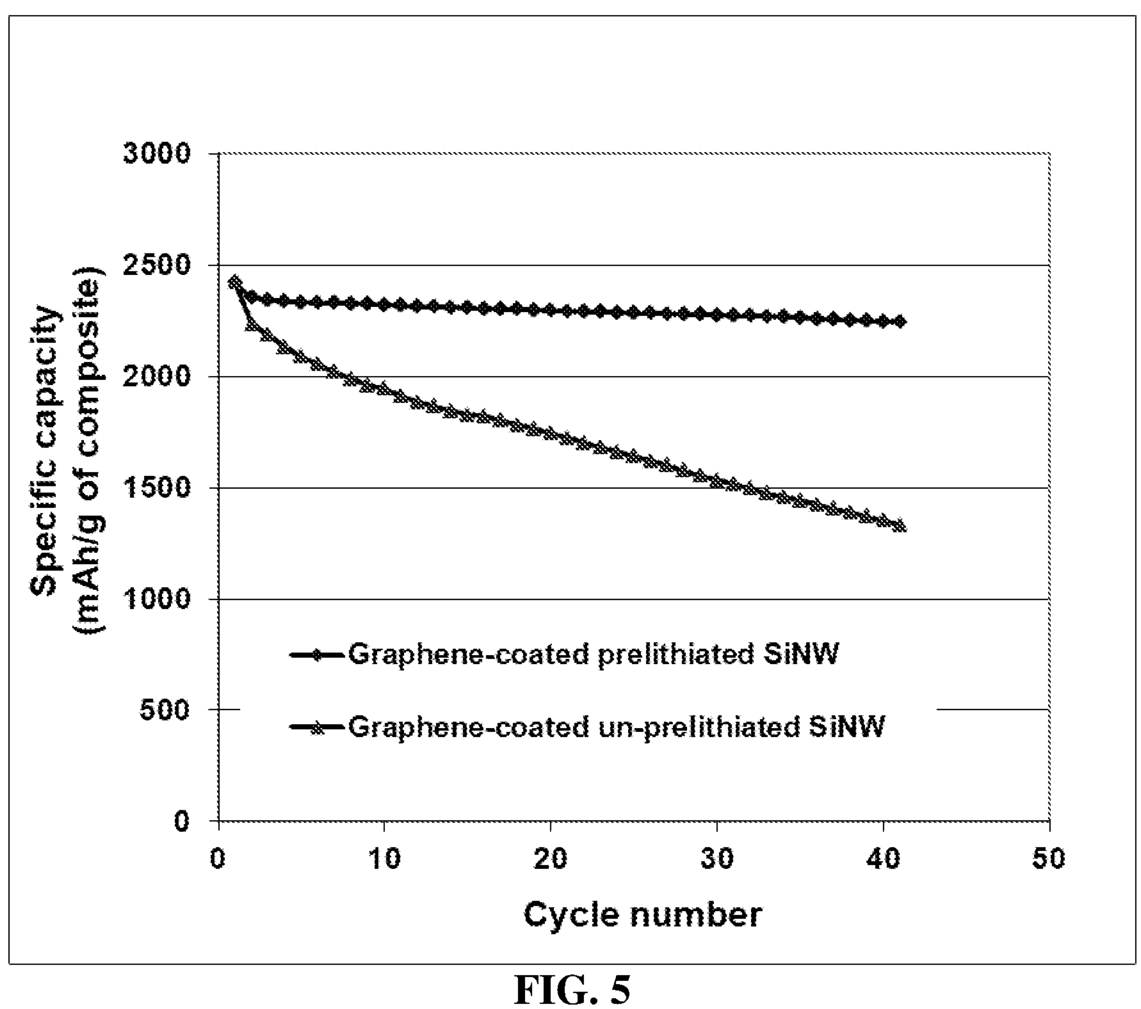
FIG. 5 Specific capacities of two lithium-ion cells, one having graphene-coated un-prelithiated Si nanowires (SiNW) as the anode active material and the other graphene-coated prelithiated SiNWs having substantially zero lithium on Si nanowire surfaces.

FIG. 5 shows the specific capacities of two lithium-ion cells, one having graphene-coated un-prelithiated Si nanowires (SiNW) as the anode active material and the other graphene-coated prelithiated SiNWs having substantially zero lithium on Si nanowire surfaces (having the desired lithium concentration gradient). These data indicate that polymer-protected, prelithiated graphene-coated Si nanowires provide a more stable cycling response. Prelithiation also improves the first-cycle efficiency and Coulomb efficiencies of subsequent cycles.

Example 5: Cycle Stability of Various Rechargeable Lithium Battery Cells

In lithium-ion battery industry, it is a common practice to define the cycle life of a battery as the number of charge-discharge cycles that the battery suffers 20% decay in capacity based on the initial capacity measured after the required electrochemical formation. Summarized in Table 1 below are the cycle life data of a broad array of batteries featuring presently invented prelithiated anode active material particles vs. other types of anode active materials.

TABLE 1

Cycle life data of various lithium secondary (rechargeable) batteries (PEG-me = polyethylene glycol methyl ether; PPO = polypropylene oxide; PEO = poly(ethylene oxide); PVDF-HFP = poly(vinylidene fluoride)-hexafluoropropylene)

| Sample ID | Protective means | Type & % of anode active material | Initial capacity (mAh/g) | Cycle life (No. of cycles) |
|---|---|---|---|---|
| Si-1 | Prelithiation + PEG-me encapsulation | 25% by wt. prelithiated C-coated Si nano particles + 67% graphite + 8% binder | 1,185 | 1,630 |
| Si-2 | Carbon coating only | 25% by wt. Si nano particles + 67% graphite + 8% binder | 1,182 | 190 |
| SiNW-1 | Prelithiation & PPO encapsulation | 35% Si nanowires + 57% graphite + 8% binder | 1,276 | 2,720 |

TABLE 1-continued

Cycle life data of various lithium secondary (rechargeable) batteries (PEG-me = polyethylene glycol methyl ether; PPO = polypropylene oxide; PEO = poly(ethylene oxide); PVDF-HFP = poly(vinylidene fluoride)-hexafluoropropylene)

| Sample ID | Protective means | Type & % of anode active material | Initial capacity (mAh/g) | Cycle life (No. of cycles) |
|---|---|---|---|---|
| SiNW-2 | No prelithiation, with PPO encapsulation | 35% Si nanowires + 57% graphite + 8% binder | 1,275 | 366 |
| $Co_3O_4$-1 | Prelithiation & encapsulation by (PEO + $Li_2CO_3$ + $Li_2C_2O_4$) | 85% lithiated $Co_3O_4$ + 8% graphite platelets + binder | 705 | 2022 |
| $Co_3O_4$-2 | No prelithiation | 85% $Co_3O_4$ + 8% graphite platelets + binder | 706 | 285 |
| $SnO_2$-1 | Prelithiation + encapsulation (PMMA + LiOH + LiF) | 75% $SnO_2$ particles | 725 | 1,276 |
| $SnO_2$-2 | No prelithiation | 75% $SnO_2$ particles | 724 | 328 |
| Ge-1 | Sulfonated polyaniline encapsulation of pre-lithiated C-coated Ge | 85% Ge + 8% graphite platelets + binder | 850 | 1,866 |
| Ge-2 | Carbon-coated Ge, no prelithiation | 85% Ge + 8% graphite platelets + binder | 849 | 133 |

The invention claimed is:

1. A prelithiated anode active material particle for use in a lithium battery, wherein said particle is capable of reversibly storing lithium ions therein during a charge or discharge of said battery and comprises an amount of lithium from 1% to 100% of a maximum lithium content contained in said anode active material particle having a first lithium concentration $C_1$ near a particle surface and a second lithium concentration $C_2$ inside said particle and away from said surface and wherein $C_1<C_2$, wherein said particle further comprises a protecting shell that wraps around, embraces or encapsulates said anode active material particle, wherein said protecting shell comprises a protecting polymer including polyethylene glycol methyl ether.

2. The prelithiated anode active material particle of claim 1, wherein said protecting shell has a thickness from 0.5 nm to 5 μm and a lithium ion conductivity from $10^{-8}$ S/cm to $5\times10^{-2}$ S/cm at room temperature.

3. The prelithiated anode active material particle of claim 1, wherein said anode active material particles are selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; and (g) combinations thereof.

4. The prelithiated anode active material particle of claim 1, wherein said anode active material particle is in a form of nano particle, nano wire, nano fiber, nano tube, nano sheet, nano belt, nano ribbon, nano disc, nano platelet, or nano horn having a thickness or diameter from 0.5 nm to 100 nm.

5. The prelithiated anode active material particle of claim 1, wherein said anode active material particle is coated with a layer of carbon, graphene, electron-conducting polymer, ion-conducting polymer, or a combination thereof that is disposed between said particle and said protective shell.

6. The prelithiated anode active material particle of claim 1, wherein said anode active material comprises a doped semiconductor material selected from Si or Ge doped with n-type and/or p-type dopants.

7. A mass of anode active material powder comprising the prelithiated anode active material particle of claim 1.

8. An anode electrode comprising said prelithiated anode active material particle of claim 1, an optional conductive additive, and an optional binder.

9. An anode electrode comprising at least a first anode active material and a second anode active material, wherein the first anode active material comprises the prelithiated anode active material particle of claim 1, and the second anode active material is different than the first anode active material.

10. A lithium-ion battery comprising the anode electrode of claim 9, a cathode electrode, and an electrolyte interposed between said anode electrode and said cathode electrode.

11. The anode electrode of claim 9, wherein the prelithiated anode active material comprises a prelithiated graphite or carbon material and said second anode active material comprises Si, $SiO_x$, Ge, Sn, or $SnO_2$, where $0<x<2.0$.

12. A particulate comprising a core and an encapsulating shell protecting said core, wherein said core comprises multiple anode active material particles wherein at least one of said multiple anode active material particles comprise the prelithiated anode active material particle of claim 1.

13. A prelithiated anode active material particle for use in a lithium battery, wherein said particle is capable of reversibly storing lithium ions therein during a charge or discharge of said battery and comprises an amount of lithium from 1% to 100% of a maximum lithium content contained in said anode active material particle having a first lithium concentration $C_1$ near a particle surface and a second lithium concentration $C_2$ inside said particle and away from said surface and wherein $C_1<C_2$, wherein said particle further comprises a protecting shell that wraps around, embraces or encapsulates said anode active material particle, wherein said protecting shell comprises a polymer and a lithium- or sodium-containing species dispersed in said polymer wherein said lithium- or sodium-containing species is selected from NaX, $Na_xSO_y$, a combination thereof, or a combination thereof with $Li_2O$ or LiF, wherein X=F, Cl, I, or Br, R=a hydrocarbon group, $0<x\leq1$, $1\leq y\leq4$.

* * * * *